United States Patent [19]

Presley

[11] 4,182,221
[45] Jan. 8, 1980

[54] RACK AND PINION POWER STEERING

[75] Inventor: Rex W. Presley, Livonia, Mich.

[73] Assignee: The Bendix Corporation, Southfield, Mich.

[21] Appl. No.: 811,112

[22] Filed: Jun. 29, 1977

[51] Int. Cl.² ............... F15B 9/10; F15B 15/17
[52] U.S. Cl. ........................... 91/378; 91/417 R; 180/148; 92/166
[58] Field of Search ............ 91/378, 376 R, 374; 92/136; 74/398, 399, 388 PS; 180/148

[56] References Cited

U.S. PATENT DOCUMENTS

| 3,209,541 | 10/1965 | Dunphy | 92/136 |
| 3,930,436 | 1/1976 | Hedenberg | 91/376 R |

FOREIGN PATENT DOCUMENTS

| 236604 | 12/1961 | Australia | 180/148 |
| 939735 | 3/1956 | Fed. Rep. of Germany | 180/148 |

Primary Examiner—Paul E. Maslousky
Attorney, Agent, or Firm—Paul David Schoenle; Ken C. Decker

[57] ABSTRACT

A rack and pinion power steering system includes a housing within which a rotatable pinion engages a rack to impart movement thereto. The rack is substantially U-shaped having a pair of arms with coaxial openings to slidably receive a rod. The rod extends from the housing to operatively engage a pair of dirigible wheels and the rod is movable relative to the housing when the rack is moved to change the direction of the pair of dirigible wheels. A sleeve on the rod is disposed between the pair of arms and is provided with a valve member to communicate pressurized fluid from a pressure source to a pressure chamber to assist the movement of the rod.

8 Claims, 3 Drawing Figures

RACK AND PINION POWER STEERING

BACKGROUND OF THE INVENTION

In my copending application REL 76-26 a rack and pinion power steering device is provided with a rod which cooperates with a pair of dirigible wheels to change the direction of the latter. The device included a bore to receive the rod and a pair of plugs for mounting the rack within a housing.

When the rack moved relative to the rod, the valve member communicated pressurized fluid from a pressure source to a pressure chamber to urge the rod to move relative to the housing, thereby providing a power assist to the movement of the rod.

U.S. Pat. Application Ser. No. 765,499 now U.S. Pat. No. 4,142,448 is a related rack and pinion power steering system wherein a rack carries a valve member for controlling fluid communication to a pair of chambers to provide a power assist to the movement of the rack.

SUMMARY OF THE PRESENT INVENTION

The present invention relates to a rack and pinion power steering device which is simpler than the device referred to above. In the present invention a rotatable pinion is engageable with a rack to impart movement to the rack. Moreover, the rack is substantially U-shaped with a pair of arms having coaxial bores for slidably receiving a rod. The rod is slidably supported by a housing which includes a first cavity for receiving the rack and pinion and a second cavity for slidably receiving a piston mounted on the rod. The piston separates the second cavity into a first chamber and a second chamber.

The rod carries a sleeve between the pair of arms, which sleeve includes a valve member engaging the pair of arms. The rod also cooperates with the housing to define a pair of chambers, one of which communicates via a passage in the housing with a pressure source.

When the pinion is rotated, the rack moves relative to the rod and sleeve and the valve member carried by the sleeve is moved from a neutral position to communicate the pressure source via passages in the rod to the other chamber. Pressurized fluid in the other chamber counteracts the pressure within the one chamber to create a pressure differential across the rod, thereby urging the rod to move relative to the housing.

A piston is provided on the rod to define the pair of chambers and a reduced diameter portion on one side of the piston provides for the pressure differential as the pressurized fluid within the pair of chambers is exposed to differential areas on the piston.

DETAILED DESCRIPTION

Figure 1:
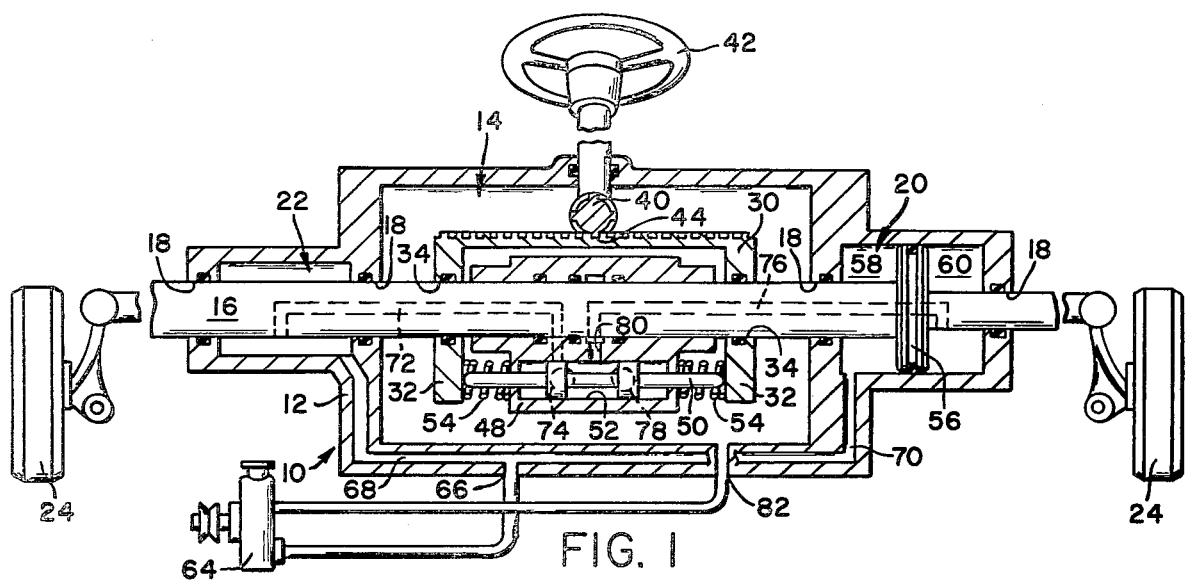
FIG. 1 is a schematic illustration, partly in cross section, of a rack and pinion power steering device made in accordance with the present invention.

The steering device 10 of FIG. 1 includes a housing 12 defining a first cavity 14. A rod 16 extends into the first cavity 14 and is slidably mounted within a plurality of housing openings at 18. The rod cooperates with these openings and the housing 12 to define a second cavity 20 and a third cavity 22. Extending from the housing 12 the rod 16 cooperatively engages a pair of dirigible wheels 24 in order to set the direction of the pair of dirigible wheels 24.

In accordance with the invention a substantially U-shaped rack 30 is provided with a pair of arms at 32 that include coaxial openings at 34 to slidably receive the rod 16. Extending into the cavity 14 is a pinion 40 which is engaged with the rack 30 to impart movement to the rack 30 when the pinion is rotated. The pinion 40 is coupled to a steering wheel 42 such that rotation of the steering wheel 42 by a vehicle operator also rotates the pinion 40 to impart movement to the rack 30 via interlocking teeth at 44.

A sleeve 48 is permanently attached to the rod 16 by any suitable means between the arms 32 of the U-shaped rack 30. The sleeve 48 carries a spool valve or valve member 50 within a stepped bore 52. As clearly seen in FIG. 1 the valve member extends from the sleeve 48 to engage the arms 32. Consequently, the valve member 50, although carried by the sleeve 48, is limited to movement with the rack 30. Moreover, a pair of springs 54 resiliently oppose any movement between the rack 30 and sleeve 48 to maintain the sleeve in a neutral position relative to the rack and also to provide feel or resistance to the vehicle operator upon rotation of the steering wheel 42.

The rod 16 includes a piston 56 which slidably engages the wall of the second cavity 20 to form a first chamber 58 and a second chamber 60. As illustrated in the embodiment of FIG. 1, the rod 16 is provided with a reduced diameter portion within the second chamber 60 so that pressurized fluid within the second chamber 60 is exposed to a larger area on the piston 56 than pressurized fluid within the first chamber 58.

In order to provide a power assist to the rack and pinion steering device 10, a fluid pressure source 64 communicates pressurized fluid to a housing inlet port 66 which, in turn, communicates via respective passages 68 and 70 to the third cavity 22 and the first chamber 58 of the second cavity 20. The rod 16 includes a passage 72 communicating the third cavity 22 with the stepped bore 52 via a sleeve port 74 and another passage 76 on the rod 16 communicates the stepped bore 52 via port 80 to the second chamber 60 of the second cavity 20. Moreover, a return port 78 on the sleeve communicates the stepped bore 52 with the first cavity 14, which communicates with the pressure source 64 via outlet port 82.

MODE OF OPERATION

In the neutral position of the valve member 50, pressurized fluid from the pressure source 64 is communicated to the stepped bore 52 via port 66, passage 68, cavity 22, passage 72 and port 74. Pressurized fluid within the stepped bore 52 is communicated by the valve member 50 to the outlet port 80 and the return port 78 to respectively communicate pressurized fluid to the second chamber 60 via passage 76 and to the pressure source 64 via cavity 14 and outlet port 82. It is important to note that fluid communication to the pressure chamber 60 experiences a pressure drop substantially equal to onehalf of the pressure generated by the pressure source when the valve member 50 is in the neutral position. This pressure drop results from restricted flow via passage 72, port 74, valve member 50, and passage 76 as well as from the venting effect of the return port 78.

With the area of the piston 56 in the first chamber 58 substantially equal to one half of the area in the second chamber 60, the pressurized fluid communicated from the pressure source 64 to the first chamber 58 via passage 70 is offset by the pressurized fluid communicated to the second chamber 60. This results from the pressure of the pressurized fluid within the second chamber 60 being substantially equal to one-half of the pressure of the pressurized fluid within the first chamber 58 and the area of the piston within the second chamber 60 being substantially twice as large as the area of the piston 56 within the first chamber 58. Consequently, when the valve member 50 is disposed in the neutral position within the sleeve 48, the rod 16 remains stationary relative to the housing 12 to fix the direction of the pair of dirigible wheels 24.

When the vehicle operator rotates the steering wheel 42 such that the pinion 40 rotates an increment in the clockwise direction, the pinion 40 rotates to move the rack 30 to the left viewing FIG. 1, thereby displacing the valve member 50 on the left relative to the sleeve 48 to increase the opening of port 74 while decreasing the opening of return port 78 via lands on the valve member. Therefore, fluid communication via passage 76 is increased to increase the pressure of fluid within the second chamber 60 so that the rod 16 is urged to the left. This leftward moving of the rod 16 pivots the pair of dirigible wheels to accomplish the change of direction mandated by the incremental rotation of the steering wheel 42. Moreover, leftward movement of the rod 16 moves the sleeve 48 relative to the valve member 50 to return the latter to the neutral position, thereby retaining the rod 16 in an incremental left position to maintain the pair of dirigible wheels in a pivotal position until the vehicle operator changes the direction of the steering wheel 42.

Figure 2:
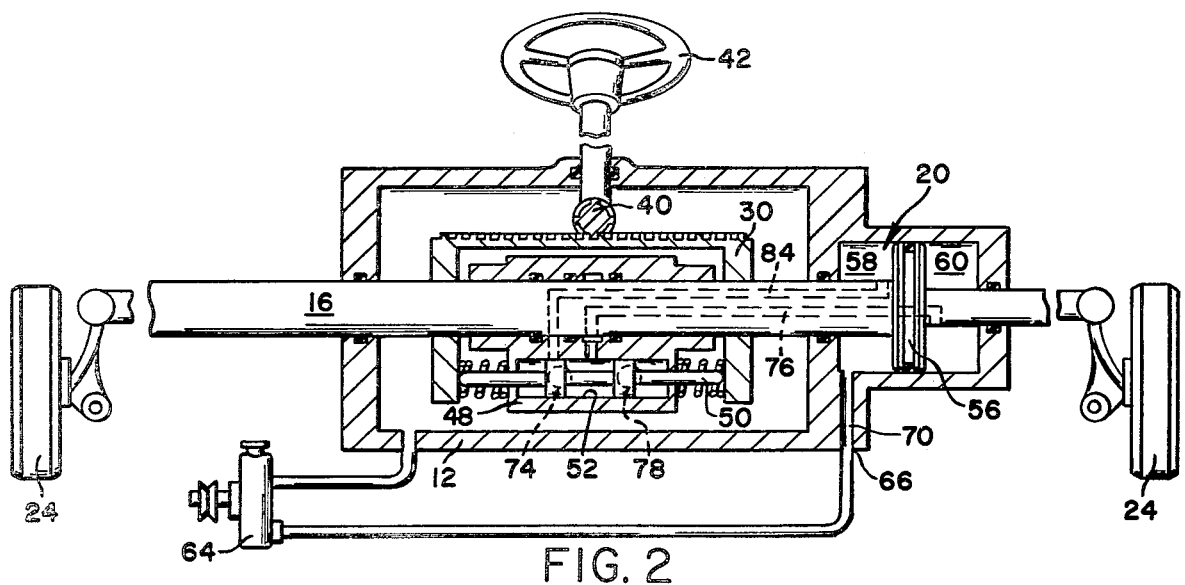
FIG. 2 is a schematic illustration, partly in cross section, of a modified embodiment of the invention in FIG. 1.

In the modified embodiment of FIG. 2, wherein like reference numerals refer to similar parts, the third cavity 22 and passage 68 are eliminated and pressurized fluid is communicated from the pressure source 64 to the first chamber 58 and then through a supply passage 84 in the rod 16 to the stepped bore 52. The valve member 50 is slidably disposed within stepped bore 52 and is engaged with the rack 30 to control communication of pressurized fluid to the second chamber 60 in the same manner of operation as described earlier with the embodiment of FIG. 1.

Figure 3:
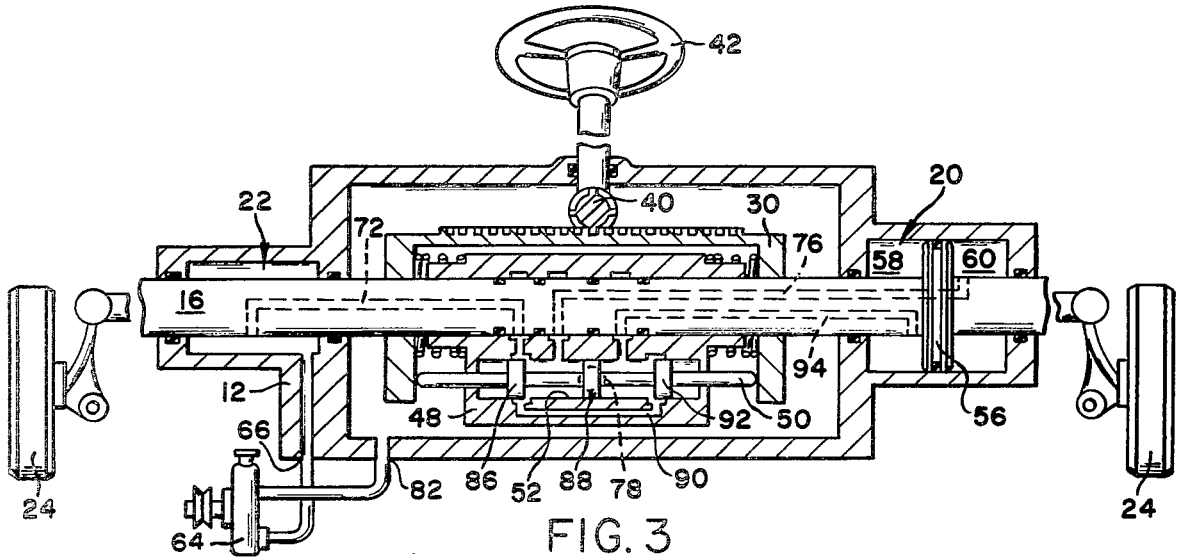
FIG. 3 is a schematic illustration, partly in cross section, of a further modified embodiment of the invention in FIG. 1.

In the embodiment of FIG. 3, wherein like reference numerals refer to similar parts, the neutral position of the valve member 50 establishes substantially equal pressures for the pressurized fluid within the first chamber 58 and the second chamber 60. This follows from the cooperation between the spool valve member 50 and the stepped bore 52. In the neutral position pressurized fluid is communicated into the stepped bore between lands 86 and 88 and then to the return port 78, to the chamber 58 via bypass passage 90, land 92 and rod passage 94 and to the chamber 60 via passage 76.

When the valve member 50 of FIG. 3 is moved to the left in response to a steering wheel 42 incremental rotation, the land 92 closes communication to the first chamber 58 via bypass passage 90 while land 88 opens the first chamber 58 to the return port 78, thereby reducing the pressure of the pressurized fluid within the first chamber 58. Moreover, land 86 increases the opening between the passages 72 and 76 to increase the pressure of the pressurized fluid within the second chamber 60 thereby urging the piston 56 and the rod 16 to the left to change the direction of the pair of dirigible wheels. The leftward movement of the rod 16 carries the sleeve 48 with it so that the valve member 50 is relocated to its neutral position relative to the sleeve 48, whereupon subsequent rotation of the steering wheel will either increase the pressure within chamber 60 and decrease the pressure within chamber 58 or increase the pressure within chamber 58 and decrease the pressure within chamber 60, depending on the direction of rotation of the steering wheel 42.

Although many alternatives and/or modifications to the present invention are possible by those skilled in the art, it is intended that all such alternatives and/or modifications are included within the scope of the invention as measured by the appended claims.

I claim:

1. A device for steering a pair of dirigible wheels comprising:
    a housing defining a cavity;
    a pinion extending into said housing cavity;
    a rack movably disposed within said housing cavity and engaging said pinion; and
    a rod extending through said housing, said rack including at least one opening through which said rod extends, said rod carrying a valve member that is movable relative to said rod, said valve member cooperating with said rack to provide for movement of said rod relative to said housing, and said rod having a pair of ends extending outwardly from corresponding sides of said housing, each of said rod ends cooperative with a corresponding dirigible wheel.

2. A steering device comprising:
    a housing defining a cavity;
    a pinion extending into said housing cavity;
    a rack movably disposed within said housing cavity and engaging said pinion; and
    a rod extending into said housing and slidably engaging said rack, said rod carrying a valve member that is movable relative to said rod and said valve member cooperating with said rack to provide for movement of said rod relative to said housing,
    said rack being substantially U-shaped with arms extending normal to said rod, said arms having coaxial openings to slidably receive said rod.

3. The steering device of claim 2 in which said arms engage said valve member to prevent movement between said rack and said valve member.

4. The steering device of claim 2 in which a sleeve is fixed to said rod between said arms and said valve member is movably disposed within said sleeve.

5. A device for steering a pair of dirigible wheels comprising:
    a housing having a first cavity therein and an inlet port and an outlet port which communicates with the first cavity;
    a pinion extending into the first cavity;
    a rack movably disposed within the first cavity and engaging said pinion;
    a rod operatively engageable with the pair of dirigible wheels and extending into the first cavity, said rod cooperating with said housing to define a second cavity remote from said rack and said rod including a piston remote from said first cavity, said piston being slidably disposed within said second cavity and dividing said second cavity into a first chamber and a second chamber, one of the first and second chambers communicating with the inlet port; and a valve member carried by said rod and engaging said rack, said rack being movable relative to said rod to move said valve member relative to said rod in order to communicate the inlet port with the other of the first and second chamber.

6. The steering device of claim 5 in which said rod includes portions extending from both sides of said piston, one of said portions comprising a reduced diameter portion.

7. A steering device comprising:

a housing having a cavity therein;

a rod slidably mounted on said housing and extending into the housing cavity;

a rack slidably engaging said rod for disposing said rack within the housing cavity;

a rotatable pinion extending into the housing cavity and engaging said rack, said pinion being rotatable to impart movement to said rack on said rod; and a sleeve attached to said rod, said sleeve carrying a valve member which engages said rack, said rack being movable relative to said rod and sleeve to move said valve member relative thereto in order to provide for movement of the rod and sleeve relative to said housing, and said rack being substantially U-shaped with a pair of arms extending transverse to said rod, said arms having coaxial openings for receiving said rod and said sleeve being disposed on said rod between said arms.

8. The steering device of claim 7 in which said sleeve is centered between said arms by resilient means and maintained in spaced relation thereto.

* * * * *